(12) United States Patent
Naglatzki et al.

(10) Patent No.: US 11,318,796 B2
(45) Date of Patent: May 3, 2022

(54) PNEUMATIC COMMERCIAL VEHICLE TIRE

(71) Applicant: Continental Reifen Deutschland GmbH, Hannover (DE)

(72) Inventors: Paul Naglatzki, Hannover (DE); Florian Kristen, Hannover (DE); Christian Meiners, Hannover (DE); Frank Lippert, Lehrte (DE)

(73) Assignee: Continental Reifen Deutschland GmbH, Hannover (DE)

( * ) Notice: Subject to any disclaimer, the term of this patent is extended or adjusted under 35 U.S.C. 154(b) by 368 days.

(21) Appl. No.: 16/488,243

(22) PCT Filed: Jan. 15, 2018

(86) PCT No.: PCT/EP2018/050802
§ 371 (c)(1),
(2) Date: Aug. 23, 2019

(87) PCT Pub. No.: WO2018/153568
PCT Pub. Date: Aug. 30, 2018

(65) Prior Publication Data
US 2020/0247190 A1   Aug. 6, 2020

(30) Foreign Application Priority Data
Feb. 24, 2017  (DE) .................... 10 2017 203 014.3

(51) Int. Cl.
*B60C 11/13*  (2006.01)
*B60C 11/03*  (2006.01)

(52) U.S. Cl.
CPC .......... *B60C 11/13* (2013.01); *B60C 11/0304* (2013.01); *B60C 2011/0365* (2013.01);
(Continued)

(58) Field of Classification Search
CPC ... B60C 11/03; B60C 11/0311; B60C 11/0306
See application file for complete search history.

(56) References Cited

U.S. PATENT DOCUMENTS

D767,474 S  * 9/2016 Reim ........................... D12/579
2011/0162769 A1  7/2011 Pirelli
(Continued)

FOREIGN PATENT DOCUMENTS

CN  105172476 A  12/2015
JP  H06127218 A  5/1994
(Continued)

OTHER PUBLICATIONS

International Search Report dated Apr. 20, 2018 of international application PCT/EP2018/050802 on which this application is based.

*Primary Examiner* — Cedrick S Williams
(74) *Attorney, Agent, or Firm* — Gregory Adams; David L. Cate

(57) ABSTRACT

A pneumatic vehicle tire, in particular a commercial vehicle tire, having a tread with transverse grooves (3, 3'), which are continuous over the tread width and which, at least in sections, are formed to the profile depth and are the main grooves of the tread.
Circumferential grooves (4) that run adjacent to one another in pairs and parallel to one another, at an angle (α) with respect to the circumferential direction of 10° to 30° and have a smaller depth than the profile depth divide the tread, with two sections (4a) in each case between three transverse grooves (3, 3') following one another in the circumferential direction, into profile blocks (1, 2), wherein pairs of circumferential grooves following one another in the circumferential direction are offset with respect to one another in the axial direction, such that the circumferential grooves (4) of the pairs of circumferential grooves begin and end at substantially the same axial positions, wherein each circumferential groove (4) reaches, with a section (4b) running beyond a transverse groove (3), into a middle profile block (2) present between the circumferential grooves (4), and
(Continued)

Figure 1:
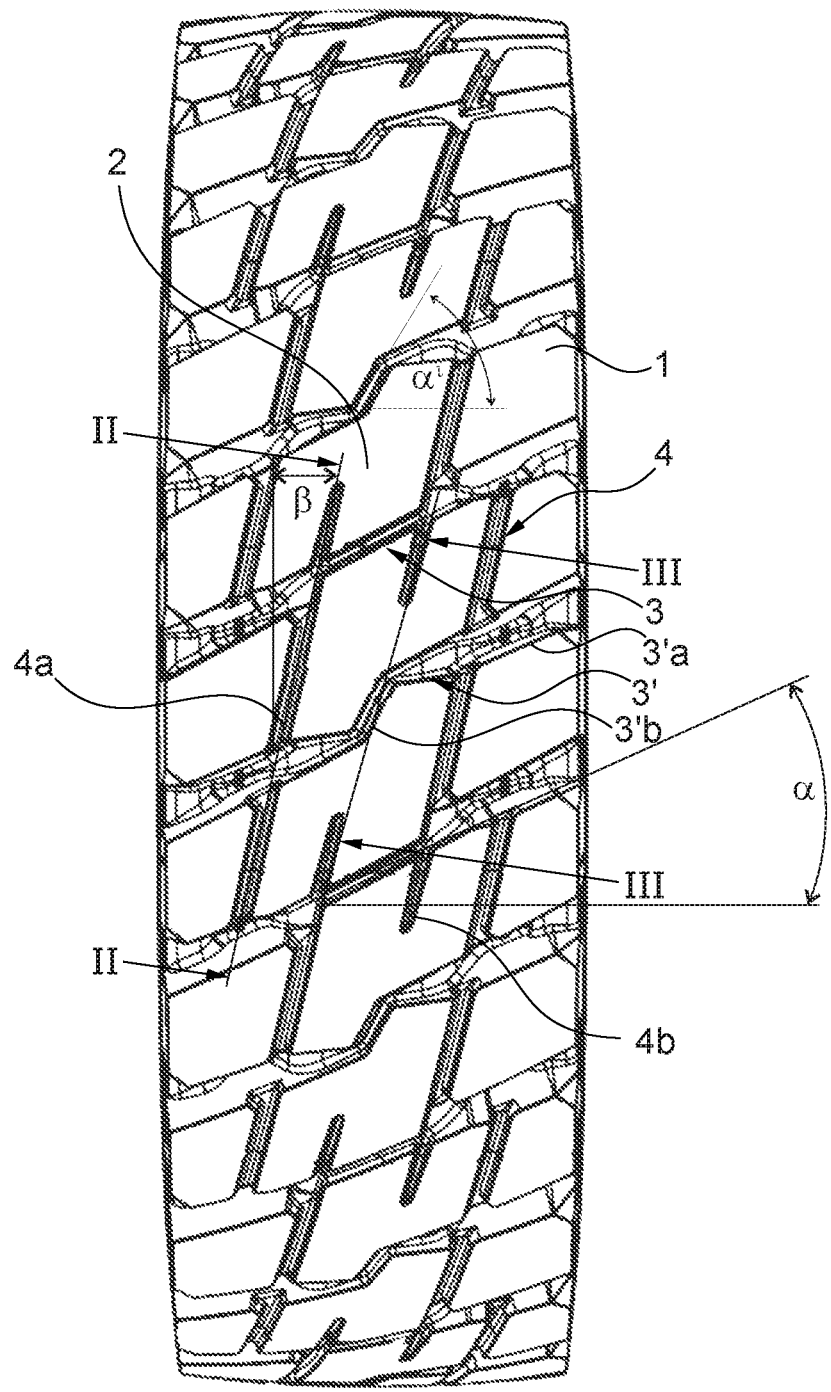

wherein each circumferential groove (4) is formed shallower in at least one section (4a, 4b) than in its other sections or its other section.

9 Claims, 2 Drawing Sheets

(52) U.S. Cl.
CPC .............. *B60C 2011/0369* (2013.01); *B60C 2011/0376* (2013.01); *B60C 2011/0379* (2013.01); *B60C 2200/06* (2013.01)

(56) References Cited

U.S. PATENT DOCUMENTS

| | | | |
|---|---|---|---|
| 2012/0267020 A1* | 10/2012 | Buchinger-Barnstorf | ................... B60C 11/033 152/209.18 |
| 2013/0206299 A1* | 8/2013 | Yoda | ................... B60C 11/0311 152/209.18 |

FOREIGN PATENT DOCUMENTS

| | | | |
|---|---|---|---|
| JP | H06143935 A | 5/1994 | |
| JP | H06305307 A | 11/1994 | |
| JP | H07132710 A | 5/1995 | |
| JP | H09300917 A | 11/1997 | |
| JP | H10324116 A | 12/1998 | |
| JP | 2002316516 A | 10/2002 | |
| WO | WO-0139994 A1 * | 6/2001 | ......... B60C 11/0316 |
| WO | 2009153821 A1 | 12/2009 | |

\* cited by examiner

PNEUMATIC COMMERCIAL VEHICLE TIRE

The invention relates to a pneumatic vehicle tire, in particular a commercial vehicle tire, having a tread with transverse grooves, which are continuous over the tread width and which, at least in sections, are formed to the profile depth and are the main grooves of the tread.

Commercial vehicle tires with such designs of the profile are known, for example as tires for industrial applications, for instance on container stackers. Transverse grooves usually run in an "elongated" Z shape over the width of the tread; the sections thereof that run up to the edges of the tread are formed very wide. The unstructured transverse blocks formed between the transverse grooves impart a high transverse stiffness to the tread, especially when new, which is unfavorable for the steering characteristics of the vehicle and promotes uneven abrasive wear.

The invention is based on the object of designing a tread of the type mentioned at the beginning in such a way that it has a more balanced stiffness of the profile and wears more evenly.

The stated object is achieved according to the invention by circumferential grooves that run adjacent to one another in pairs and parallel to one another, at an angle with respect to the circumferential direction of 10° to 30° and have a smaller depth than the profile depth dividing the tread, with two sections and in each case between three transverse grooves following one another in the circumferential direction, into profile blocks, wherein pairs of circumferential grooves following one another in the circumferential direction are offset with respect to one another in the axial direction, such that the circumferential grooves of the pairs of circumferential grooves begin and end at substantially the same axial positions, wherein each circumferential groove reaches, with a section running beyond a transverse groove, into a middle profile block present between the circumferential grooves, and wherein each circumferential groove is formed shallower in at least one section than in its other sections or its other section.

The circumferential grooves provided according to the invention achieve the effect of an altogether uniform stiffness and even abrasive wear in a tread, which has transverse grooves that are distinctly formed as main grooves and are very deep. Because of their shallower sections, with increasing wear, the circumferential grooves "disappear" in a way that is scarcely noticeable in the vehicle handling characteristics.

In the case of a preferred embodiment of the invention, the section of each circumferential groove reaching into the middle profile blocks is shallower than at least one of the two sections dividing the tread between transverse grooves into profile blocks. This embodiment provides a particularly favorable distribution of the stiffness in the tread.

In the case of a further advantageous embodiment of the invention, the shallower formed section of the circumferential groove has a depth profile with a continuously reducing depth. This variant of the embodiment avoids abrupt changes in the vehicle handling characteristics of the tire with increasing wear in a particularly favorable way.

It is therefore also of advantage if the depth of the sections of the circumferential grooves reaching into the middle profile blocks decreases continuously, beginning from the regions where they enter the transverse grooves up to their ends within the profile blocks. In the case of a particularly favorable depth profile of these sections, they have at the regions where they enter the transverse grooves a depth which corresponds to 10% to 40% of the profile depth, the depth decreasing by the end of the sections to 10% to 30% of the depth at the regions where they enter.

For even wear, it is also advantageous if the width of the sections of the circumferential grooves reaching into the middle profile blocks also decreases in the direction of their ends. Also preferred is an embodiment in which the circumferential grooves have in the section(s) outside the shallower section or the shallower sections a constant depth of 10% to 40% of the profile depth.

A further measure according to the invention that has a favorable effect on the distribution of the stiffness within the tread is that the circumferential grooves have in the two sections dividing the tread into profile blocks a constant width of 3 mm to 10 mm.

In the case of a further advantageous variant of the embodiment of the invention, the middle transverse groove of the three transverse grooves that are divided by the pairs of circumferential grooves into profile blocks is in each case provided in the middle region of the tread with a kinked section, which is oriented the same as the sections that are adjacent in the circumferential direction and reach into the middle profile blocks, and in particular has a depth which corresponds to the depth of these sections at the regions where they enter the transverse grooves. These kinked sections have the effect that the middle profile blocks are configured in a way that is favorable for even abrasive wear of the tread. It is also advantageous in this connection if the kinked section has a width which corresponds to the width of those sections of the circumferential grooves that divide the tread into profile blocks.

Figure 2:
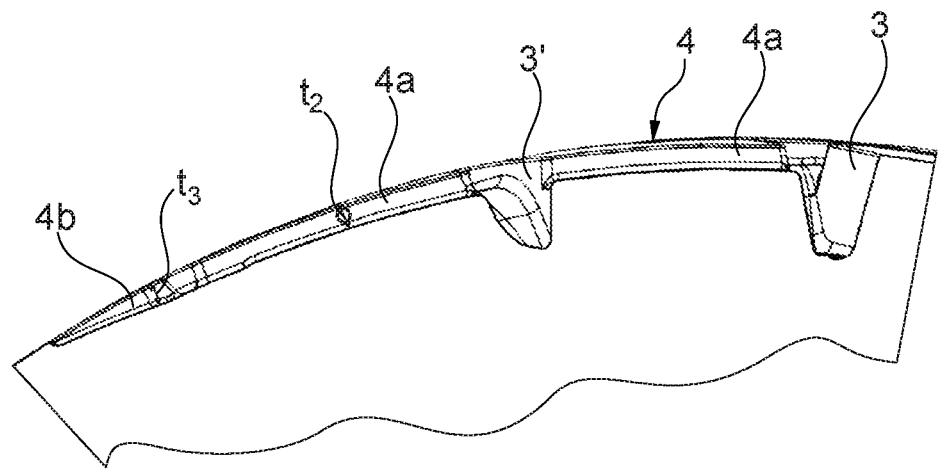
Figure 3:
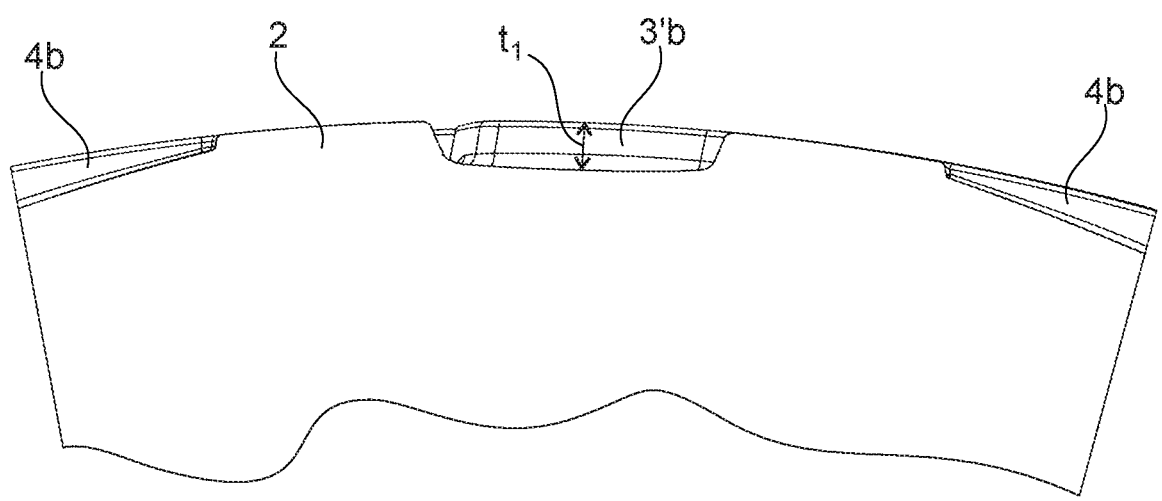

Further features, advantages and details of the invention will now be described in more detail on the basis of the drawing, which illustrates an exemplary embodiment and in which FIG. 1 shows a front view of a pneumatic vehicle tire, FIG. 2 shows a section along the line II-II of FIG. 1 and FIG. 3 shows a section along the line of FIG. 1.

Pneumatic vehicle tires embodied according to the invention are in particular off-road tires or commercial vehicle tires for a wide variety of intended uses, preferably large-size commercial vehicle tires for rim diameters of at least 24 inches. Such tires are for example tires for straddle carriers, reach stackers or container stackers. Tires embodied according to the invention have a single- or multi-ply carcass, either in the form of a radial carcass or of a diagonal carcass, and a multi-ply belt assembly or a plurality of breaker plies.

The profiled tread shown in FIG. 1 has a block structure with profile blocks 1, 2 of relatively large dimensions, to be specific shoulder-side profile blocks 1 and middle profile blocks 2, arranged in the middle region of the tread. The block structure is created by distinct transverse grooves 3, 3', formed in the tread and crossing the tread, and by circumferential grooves 4, running adjacent to one another in pairs and terminating at both ends in the tread. The transverse grooves 3, 3', which follow one another alternately in the circumferential direction, extend substantially parallel to one another and at an acute angle α with respect to the axial direction of 20° to 40°, in the case of the present embodiment of the order of magnitude of approximately 30°. Between the transverse grooves 3, 3' following one another in the circumferential direction there is in each case a middle profile block 3 and to each side thereof a shoulder-side profile block 1.

The transverse grooves 3, 3' are the main grooves and those grooves in the tread that are formed at the profile depth, at least in sections, in the case of commercial vehicle tires the profile depth being, depending on the tire size and intended use of the tire, 12.00 mm to 95.00 mm. In the case of the embodiment shown, the transverse grooves 3 run substantially straight over the width of the tread; the transverse grooves 3' are locally kinked twice in the middle of the tread, such that the transverse grooves 3' have two transverse groove sections 3'*a*, running substantially parallel to one another and from the middle of the tread to the edges of the tread at the angle α, and a shorter transverse groove section 3'*b*, connecting the former two sections and running at an angle α' with respect to the circumferential direction of 15° to 30°. The transverse groove sections 3'*b* also have, as FIG. 3 shows, a depth $t_1$ that is constant over their extent, is smaller than the profile depth and is 10% to 40% of the profile depth. How the transverse grooves 3, 3' are otherwise embodied, with wider and narrower sections and raised base portions and the like, is not the subject of the invention and is therefore not explained in detail.

The circumferential grooves 4 all run parallel to one another and at an angle β with respect to the circumferential direction of 10° to 30°, in the case of the embodiment shown of the order of magnitude of 15°. Two circumferential grooves 4 running adjacent to one another in pairs divide the tread, with sections 4*a* in each case between a transverse groove 3, a transverse groove 3', arranged adjacent to the latter, and the next transverse groove 3 adjoining in the circumferential direction, into the profile blocks 1, 2. Pairs of circumferential grooves following one another in the circumferential direction are offset with respect to one another in the axial direction, such that the circumferential grooves 4 of the pairs of circumferential grooves begin and end at the same axial positions. Each circumferential groove 4 also in each case runs with a section 4*b* into a middle profile block 2, which is formed between pairs of circumferential grooves adjoining in the circumferential direction. The sections 4*a* in each case end in the middle region of the profile block 2 concerned.

The sections 4*a* of the circumferential grooves 4 have between the profile blocks 1 and 2 a constant width—apart from the regions where they directly enter the transverse grooves 3, 3'—, which can vary, depending on the tire size and intended use of the tire, but at the periphery of the tread is at least 3.0 mm and may be up to 10.0 mm. In particular, the sections 4*a* of the circumferential grooves 4 have one of the customary cross sections, with groove flanks in the radial direction or inclined at a small acute angle with respect to the radial direction of up to 10° and a groove base that is in particular rounded in a known way. The sections 4*a* also have a constant depth $t_2$, which corresponds to 10% to 40% of the profile depth. As FIG. 1 shows, the sections 4*b* have a smaller width than the sections 4*a*; their width at the region where they enter the respective transverse groove 3 is 10% to 30% smaller than the width of the sections 4*a*. The width of the sections 4*b* is reduced toward the end of the sections 4*b* by up to 50%. The sections 4*b* also have a depth $t_3$, which becomes smaller from their depth at the regions where they enter to the ends of the sections 4*b*. As the sectional representation in FIG. 3 shows, the depth of the sections 4*b* is reduced, beginning from the region where they enter the respective transverse groove 3, where the depth preferably corresponds to the depth $t_2$, continuously up to the end of the sections 4*b* to a depth which corresponds to 10% to 30% of the depth $t_2$.

In the case of further embodiments of the invention, the circumferential grooves 4 are formed shallower in another section, for instance in one of the sections 4*a*, than in the second section 4*a*. This measure may be performed in addition or as an alternative to the described embodiment of the section 4*b*. In this case, either this section 4*a* is formed shallower over its length or there is a substantially continuous change in the depth, in particular starting from the regions where it enters the transverse grooves 3, 3' into the middle region of the section 4*a* concerned. The smallest depth is 10% to 20% of the depth $t_2$.

LIST OF REFERENCE SIGNS

| | |
|---|---|
| 1 | Profile block |
| 2 | Profile block |
| 3 | Transverse groove |
| 3' | Transverse groove |
| 3'a, 3'b | Section |
| 4 | Circumferential groove |
| 4a, 4b | Section |
| $t_1, t_2, t_3$ | Depth |
| T | Profile depth |
| α, α' | Angle |
| β | Angle |

The invention claimed is:

1. A pneumatic commercial vehicle tire comprising a tread with transverse grooves which are continuous over width of the tread, and which, at least in sections, are formed to a profile depth and are main grooves of the tread;
    wherein the pneumatic commercial vehicle tire further comprises circumferential grooves that run adjacent to one another in pairs and parallel to one another, at an angle with respect to a circumferential direction of from 10° to 30° and have a smaller depth than the profile depth which divides the tread, with two sections in each case between three transverse grooves following one another in the circumferential direction, into profile blocks;
    wherein pairs of circumferential grooves following one another in the circumferential direction are offset with respect to one another in the axial direction, such that the circumferential grooves of the pairs of circumferential grooves begin and end at substantially the same axial positions, wherein each circumferential groove reaches, with a section running beyond a transverse groove, into a middle profile block present between the circumferential grooves, and wherein each circumferential groove is formed shallower in at least one section than in its other sections or its other section; and
    a middle transverse groove of the three transverse grooves that are divided by the pairs of circumferential grooves into the profile blocks has in each case in the middle region of the tread a kinked section, which is oriented the same as the sections that are adjacent in the circumferential direction and reach into middle profile blocks, and in particular has a depth which corresponds to the depth of these sections at the regions where they enter the transverse grooves.

2. The pneumatic commercial vehicle tire as claimed in claim 1, wherein the section of each circumferential groove reaching into middle profile blocks is shallower than at least one of the two sections dividing the tread between transverse grooves into the profile blocks.

3. The pneumatic commercial vehicle tire as claimed in claim 1, where the shallower formed section of the circumferential groove has a depth profile with a continuously reducing depth.

4. The pneumatic commercial vehicle tire as claimed in claim 1, wherein depth of the sections of the circumferential grooves reaching into middle profile blocks decreases continuously, beginning from the regions where they enter the transverse grooves up to their ends within the profile blocks.

5. The pneumatic commercial vehicle tire as claimed in claim 1, wherein depth of the sections of the circumferential grooves reaching into middle profile blocks at the regions where they enter the transverse grooves corresponds to 10% to 40% of the profile depth and by the end of the sections decreases to 10% to 30% of the depth at the regions where they enter.

6. The pneumatic commercial vehicle tire as claimed in claim 1, wherein width of the sections of the circumferential grooves reaching into middle profile blocks decreases in the direction of their ends.

7. The pneumatic commercial vehicle tire as claimed in claim 1, wherein the circumferential grooves have in sections outside shallower sections, a constant depth of 10% to 40% of the profile depth.

8. The pneumatic commercial vehicle tire as claimed in claim 1, wherein the circumferential grooves have in the two sections dividing the tread into the profile blocks a constant width of 3 mm to 10 mm.

9. The pneumatic commercial vehicle tire as claimed in claim 1, wherein the kinked section has a width which corresponds to the width of those sections of the circumferential grooves that divide the tread into the profile blocks.

* * * * *